J. F. ATWOOD.
FASTENING DEVICE FOR SHOES AND THE LIKE.
APPLICATION FILED FEB. 28, 1912.
Reissued Apr. 2, 1912. 13,392.
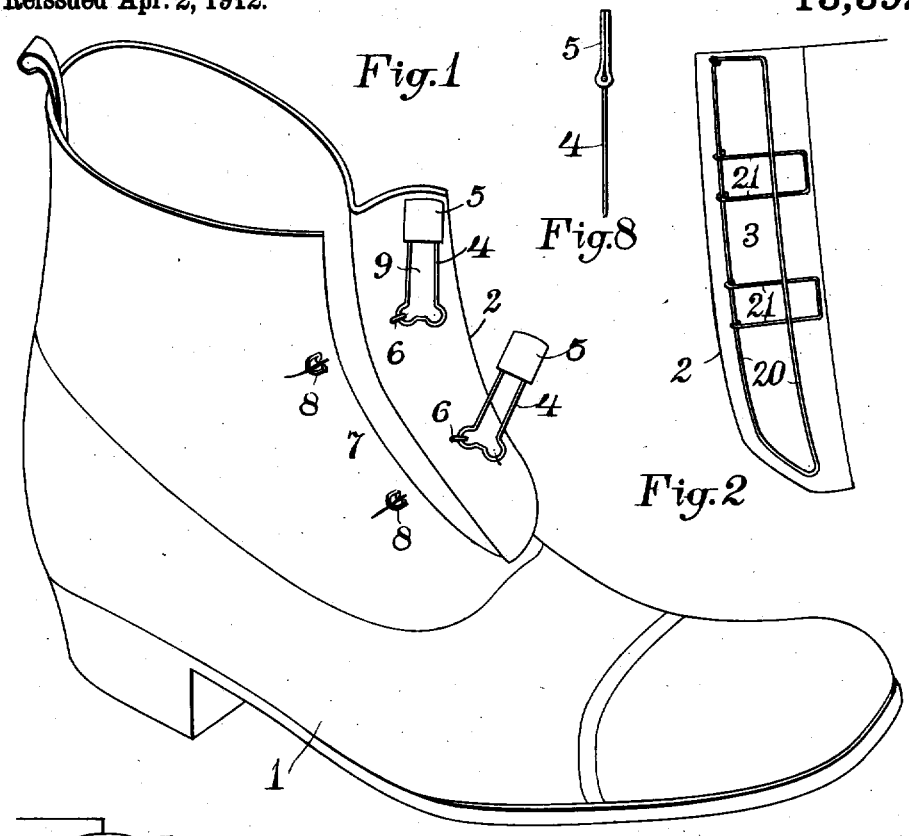
Fig.2
Fig.8
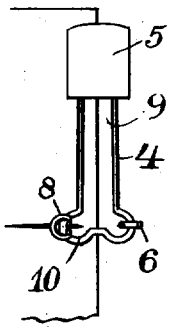
Fig.3
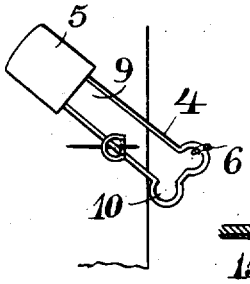
Fig.4
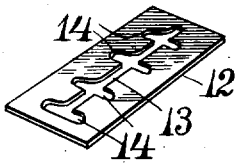
Fig.5
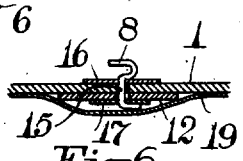
Fig.6
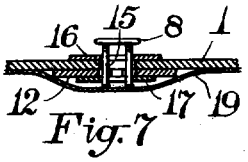
Fig.7
Witnesses;
Fred G. Dilfm
E. H. Waite
Inventor,
James F. Atwood;
By A. B. Upham.
Attorney.
COLUMBIA PLANOGRAPH CO., WASHINGTON, D. C.

UNITED STATES PATENT OFFICE.

JAMES F. ATWOOD, OF CLAREMONT, NEW HAMPSHIRE.

FASTENING DEVICE FOR SHOES AND THE LIKE.

13,392. Specification of Reissued Letters Patent. Reissued Apr. 2, 1912.

Original No. 1,015,928, dated January 30, 1912, Serial No. 553,154. Application for reissue filed February 28, 1912. Serial No. 680,561.

*To all whom it may concern:*

Be it known that I, JAMES F. ATWOOD, a citizen of the United States, and a resident of Claremont, in the county of Sullivan and State of New Hampshire, have invented certain new and useful Improvements in Fastening Devices for Shoes and the Like, of which the following is a specification.

This fastening device is designed primarily for shoes, but it may be adapted for gloves, umbrella covers and other similar articles.

Referring to the drawings forming part of this specification, Figure 1 is a perspective view of a shoe having fastening devices made in accordance with my invention. Fig. 2 is a face view of the stiffening frame used in the flap of the shoe. Fig. 3 is a face view of a fastening device in its final, or fastening, position. Fig. 4 is a similar view but showing the fastening device in an intermediate position. Fig. 5 is a perspective view of the adjusting plate by means of which one of the fastening devices is adjusted in its tightness of pull. Fig. 6 is a sectional view showing one such plate and the hook in its position of adjustment. Fig. 7 is a similar view, but showing such hook as firmly held in position. Fig. 8 is an edge view of one of the fastening devices.

As illustrated in Fig. 1, the shoe 1 is provided with a hinged flap 2 having secured between its leather and lining a metallic stiffening frame 3 shown in Fig. 2. This flap and frame are so curved as to receive the more or less cylindrical shape indicated in Fig. 1, and thereby render the flap capable of snugly hugging the surface of the shoe.

Loosely fulcrumed to the inner face of the flap 2 are two locking levers 4 preferably of wire having their outer ends provided with leather operating members or thumb-pieces 5. Each said lever is formed of wire bent over upon itself and inclosing a space substantially that of a capital T, with its ends attached to a thumb-piece 5, and having one of its lateral branches loosely held by an eye 6 fastened to the flap 2. The flap 2 being brought over toward the opposite flap 7 of the shoe, the two locking levers are engaged with the two hooks 8 in the manner illustrated by Fig. 4,—that is, with each hook entering the lever-space 9 well up toward the thumb-piece thereof; and then said levers are pulled over to a vertical position, thereby forcibly drawing the shoe-flaps snugly together. As soon as the branch 10 of each lever reaches its engaged hook 8, the latter is locked therein by the incurved formation of such branch, and thereby holds the fastening device from accidentally releasing itself. All that needs to be done to unfasten the shoe is to swing the locking levers over horizontally, applying only such force as is necessary to disengage the branches or locking recesses 10 from their hooks 8, and then releasing said levers entirely from the same.

One objection to this fastening device, and one common to even the old system of lacing, is that it is not capable of variation in tightness. If the feet swell a little, there is no means of allowing therefor. I have therefore further improved upon the fastening device as thus far described, by rendering it capable of quick and easy adjustment. To do this, each hook 8 is made slidable in a slot 11 in the leather, and is provided with an adjusting plate 12 for holding it at any one of a plurality of positions. Referring to Fig. 5, it will be seen that this plate is formed with a longitudinal slot 13 having several lateral notches 14. By having the hook pass through said slot, as in Figs. 6 and 7, and making the stem 15 flat, when the hook is in its normal position said flat stem reaches across from one notch 14 to the one directly opposite thereto, and is thereby held from displacement in the slot 13. But by giving the hook a quarter turn to present its stem in line with said slot, it can then be freely moved from end to end of the slot and again locked in any pair of the notches which will give the desired adjustment. To permit the stem of the hooks to be easily put into engagement with said notches, one corner of one notch in each pair is rounded off, as shown in Fig. 5. By first introducing an edge of a hook-stem in an unrounded notch, such stem can then be rotated into the rounded notch. The left hand end of the plate as illustrated in Fig. 5 is the one which should be located toward the flap 2, in order that the strain upon the hook may be resisted by the unrounded shoulders of the notches containing its stem.

In Figs. 6 and 7, the hook is shown as provided with what may be termed washers, 16 and 17; but these are not essential thereto. The lining 19 incloses the plate and inner part of each hook and guards against any wear on the stockings of the wearer of the shoe. The abnormal thickness of the part of the shoe containing the fastening hooks illustrated in Figs. 6 and 7 is merely for clearness in showing. In actual practice there is no such thickness needed.

As shown in Fig. 2, the stiffening frame for the flap 2 is preferably composed of wire in two parallel lengths 20, and two transversely located loops 21, the latter being suitably curved to give to the flap 2 its required partially cylindrical contour. I prefer to have the fastening levers 4 attached to the flap 2 at points close to, or even at, the intersections of the frame-wires 20 and 21, in order to better insure the close confinement of the flap over the shoe-opening. The thumb-pieces 5 are also preferably made by folding a strip of leather over upon itself and pasting or stitching the two sections together, after the ends of the wire locking levers have been inserted through the bight of the leather and bent over to hold the same in place.

Although I have described the fastening levers 4 as being made from wire, I do not confine myself to such material; neither do I confine myself to wire for the construction of the stiffening frame 3, as it is evident that such members may be stamped out of sheet metal, compressed fiber and the like. It is further evident that other forms of fastening devices beside the hooks 8 may be made adjustable in position by a substantially like arrangement to that described.

What I claim as my invention and for which I desire Letters Patent is as follows, to wit:—

1. The combination with a shoe having the usual opening, of a fastening means for said opening comprising a member located beneath the outermost layer of the material composing the shoe, and having a plurality of attaching points, a member adapted to be engaged with any of said points, said material being constructed to permit the access of the second-named member to the first-named member at any of said points, and a locking device attached to the side of said opening not provided with said members and adapted to be engaged with the second-named member.

2. The combination with an article having separable sections, of a fastening device therefor having one member attached to one of the separable sections and the other to the opposing separable section, one of the means of attachment comprising a plate formed with a longitudinal slot having a plurality of lateral notches, and a device penetrating said slot and adapted when turned in one direction to freely pass along said slot, but when turned in another direction to enter a pair of said notches and be thereby held in an adjusted position.

3. The combination with an article having separable sections, of a fastening device therefor one of whose members comprises a hook having a laterally flattened stem, and a plate having a longitudinal slot formed with lateral notches in opposing pairs, said hook being movably located within said slot.

In testimony that I claim the foregoing invention, I have hereunto set my hand this 30th day of March, 1910.

JAMES F. ATWOOD.

Witnesses:

A. B. Upham,

H. L. Whittlesey.

Copies of this patent may be obtained for five cents each, by addressing the "Commissioner of Patents, Washington, D. C."